US009316764B2

(12) United States Patent
Faivre et al.

(10) Patent No.: US 9,316,764 B2
(45) Date of Patent: Apr. 19, 2016

(54) DOWNHOLE TOOL FOR DETERMINING FORMATION PROPERTIES

(75) Inventors: Ollivier Faivre, Paris (FR); Geoff Weller, Berowra Heights (AU)

(73) Assignee: Schlumberger Technology Corporation, Sugar Land, TX (US)

( * ) Notice: Subject to any disclaimer, the term of this patent is extended or adjusted under 35 U.S.C. 154(b) by 937 days.

(21) Appl. No.: 12/921,433

(22) PCT Filed: Feb. 27, 2009

(86) PCT No.: PCT/IB2009/000425
§ 371 (c)(1),
(2), (4) Date: Oct. 28, 2010

(87) PCT Pub. No.: WO2009/112914
PCT Pub. Date: Sep. 17, 2009

(65) Prior Publication Data
US 2011/0060526 A1  Mar. 10, 2011

(30) Foreign Application Priority Data
Mar. 11, 2008 (EP) .................................. 08102513

(51) Int. Cl.
*G01V 11/00* (2006.01)
*G01V 5/10* (2006.01)
(52) U.S. Cl.
CPC ................ *G01V 11/00* (2013.01); *G01V 5/104* (2013.01)

(58) Field of Classification Search
CPC ................................ G01V 11/00; G01V 5/104
USPC ............ 702/6–11; 703/2, 10; 166/247, 252.5, 166/250.02; 73/152.01, 152.05, 152.12, 73/152.14, 152.46
See application file for complete search history.

(56) References Cited

U.S. PATENT DOCUMENTS

| 4,095,102 | A | * | 6/1978 | Tixier ............................ 250/265 |
| 4,909,075 | A | * | 3/1990 | Flaum et al. ................ 73/152.05 |
| 5,463,549 | A | | 10/1995 | Dussan |
| 5,869,968 | A | * | 2/1999 | Brooks et al. .................. 324/338 |
| 6,167,348 | A | | 12/2000 | Cannon |
| 6,344,746 | B1 | | 2/2002 | Chunduru |
| 6,591,673 | B1 | * | 7/2003 | Liu ............................ 73/152.18 |
| 2005/0028586 | A1 | * | 2/2005 | Smits et al. ................. 73/152.14 |
| 2005/0165553 | A1 | * | 7/2005 | Jammes et al. .................. 702/11 |
| 2006/0015258 | A1 | * | 1/2006 | Dubourg et al. ................ 702/11 |
| 2006/0131016 | A1 | | 6/2006 | Snoga |
| 2007/0061082 | A1 | * | 3/2007 | Seleznev et al. ................ 702/11 |

FOREIGN PATENT DOCUMENTS

EP  1795921 A1 * 6/2007  ............. G01V 11/00
EP  1953571 A1  8/2008

OTHER PUBLICATIONS

Chardac, et al., In search of saturation, Nov. 17, 1996, Middle East Well Evaluation Review, pp. 22-37.*

(Continued)

*Primary Examiner* — Mischita Henson

(57) ABSTRACT

A downhole tool and method for determining properties of a formation. The method comprising irradiating the formation with a nuclear source; performing both a resistivity and a sigma measurement at each of different radial depths into the formation with a plurality of detectors; and inputting the measurements into a predetermined model for determining the properties of the formation.

11 Claims, 4 Drawing Sheets

(56) References Cited

OTHER PUBLICATIONS

Aqivlera R—A new approach for log Analysis of the Pulsed Neutron and Resistivity Log Combination—Journal of petroleum Technology, vol. 31 No. 4 Apr. 1979.

Neville T.J. Faivre O. Sun HT., Weller G. Integrated Interpretation of a Rich Data Set from a New-Generation LWD Tool Societe of Petroleum Engineers, SPE, Oct. 12, 2005.

Gauthier J., Hussain H., Boling J., Edwards J, Herold B. Determination of water-producing zones while underbalanced Drilling horizontal wells—Integration of Sigma Log and Real-time production data Societe of Petroleum Engineers, SPE, Mar. 14, 2007.

Search Report and Examination Report for the equivalent GC patent application No. GCC/P/2009/13013 issued on Feb. 24, 2014.

* cited by examiner

DOWNHOLE TOOL FOR DETERMINING FORMATION PROPERTIES

CROSS-REFERENCE TO RELATED APPLICATIONS

The present application is based on and claims priority to EP Application No. EP08102513.2, filed Mar. 11, 2008; and International Patent Application No. PCT/IB2009/000425, filed Feb. 27, 2009. The entire contents of each are herein incorporated by reference.

FIELD OF THE DISCLOSURE

The invention relates to a downhole tool and in particular, but not exclusively, to a downhole tool for determining the properties a formation.

BACKGROUND OF THE DISCLOSURE

In the oil services industry after a particular hydrocarbon (oil or gas) reservoir has been discovered, the first stage of creating a producing well is concerned with drilling a borehole down into the earth's crust to reach the desired hydrocarbon reservoir. During this drilling phase, often various measurement tools are mounted on, or close to, the tip of the drill so as to provide petroleum engineers with the most up-to-date data of the drilling and the surrounding formation. Specifically, during the drilling stage various detectors can be used, for example, to measure the resistivity and porosity of the surrounding formation and sending the results back to the surface for evaluation.

Even after the borehole has been drilled, it may be desirable to lower various measurement tools down the borehole in order to try and characterize the surrounding formation at different depths in the borehole. Such measurements are all useful in providing a more accurate characterization of the constituent elements of the surrounding formation. Specifically, one is able to obtain a more accurate estimate of the quality and quantity of hydrocarbon in the surrounding formation. The hydrocarbon fluid can either be in gas form (i.e. natural gas) or in liquid form (i.e. petroleum or petroleum with dissolved gas).

FIG. 1 illustrates a wellsite system in which the present invention can be employed. The wellsite can be onshore or offshore. In this exemplary system, a borehole 11 is formed in subsurface formations by rotary drilling in a manner that is well known. Embodiments of the invention can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment a logging-while-drilling (LWD) module 120, a measuring-while-drilling (MWD) module 130, a rotary-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a nuclear measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

The formation surrounding a borehole typically comprises a plurality of different constituent materials including solids, such as different rocks or sands, and also the fluids whose quantity one wishes to measure. It is possible to distinguish between these constituent elements by measuring their respective densities and other properties. After or during the drilling process, fluid from the borehole may penetrate into the surrounding formation mixing with the fluid (hydrocarbon or water) and thereby distorts the measurement. This will affect measurements that probe the partially or completely invaded zone of the formation. The effect can be particularly noticeable when the properties of the borehole fluid are significantly different from those of the formation.

The European patent application that was published as EP 1 705 921 describes a method for determining the porosity and fluid saturation of a formation using a nuclear tool.

European patent application 07290143 filed on 5 Feb. 2007 describes a nuclear downhole tool having a plurality of detectors each having multiple depths of investigation into the formation for establishing an invasion profile of fluid into the formation and correcting for a formation property to be measured.

However, it is desirable to be able to determine the formation properties directly from the measured properties without performing any further or correction steps.

SUMMARY

According to one aspect of the disclosure, a downhole tool for determining properties of a formation is provided. The tool includes a nuclear source for irradiating the formation, multiple detectors capable of measuring at multiple radial depths into the formation, and multiple antennas capable of measuring at multiple radial depths into the formation. The detectors and the antennas are collocated or at least partly overlap. The downhole tool also includes a controller for enabling the antennas and the detectors to perform a resistivity and a sigma measurement for the multiple radial depths and a processing apparatus arranged to combine the detector measurements to determine the properties of the formation.

According to another aspect of the disclosure, a method for determining properties of a formation includes irradiating the formation with at least one nuclear source, performing both a resistivity and a sigma measurement at each of different radial depths into the formation with sensors and antennas that are collocated or at least partly overlap, and combining the measurements for determining the properties of the formation.

BRIEF DESCRIPTION OF THE DRAWINGS

Embodiments of the present invention will now be described by way of an example with reference to the accompanying drawings, in which.

DETAILED DESCRIPTION OF EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Broadly speaking, 'resistivity' can be defined as the electrical resistance per unit length of a formation whereas 'sigma' can be defined as the thermal capture cross section of scattered neutrons measured in a formation.

Figure 1:
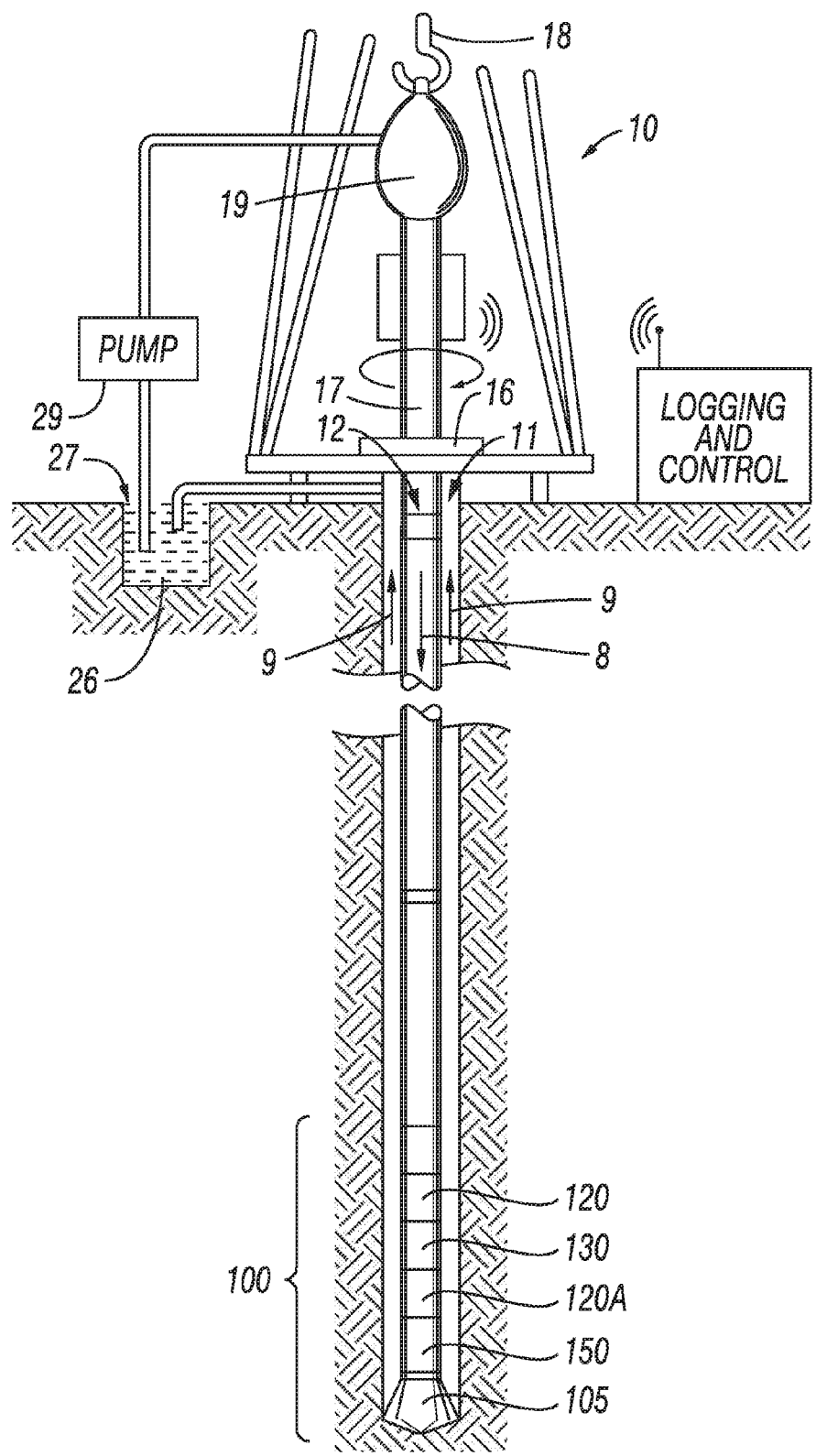
FIG. 1 shows a wellsite system in which an embodiment of the present invention can be employed.
Figure 2:
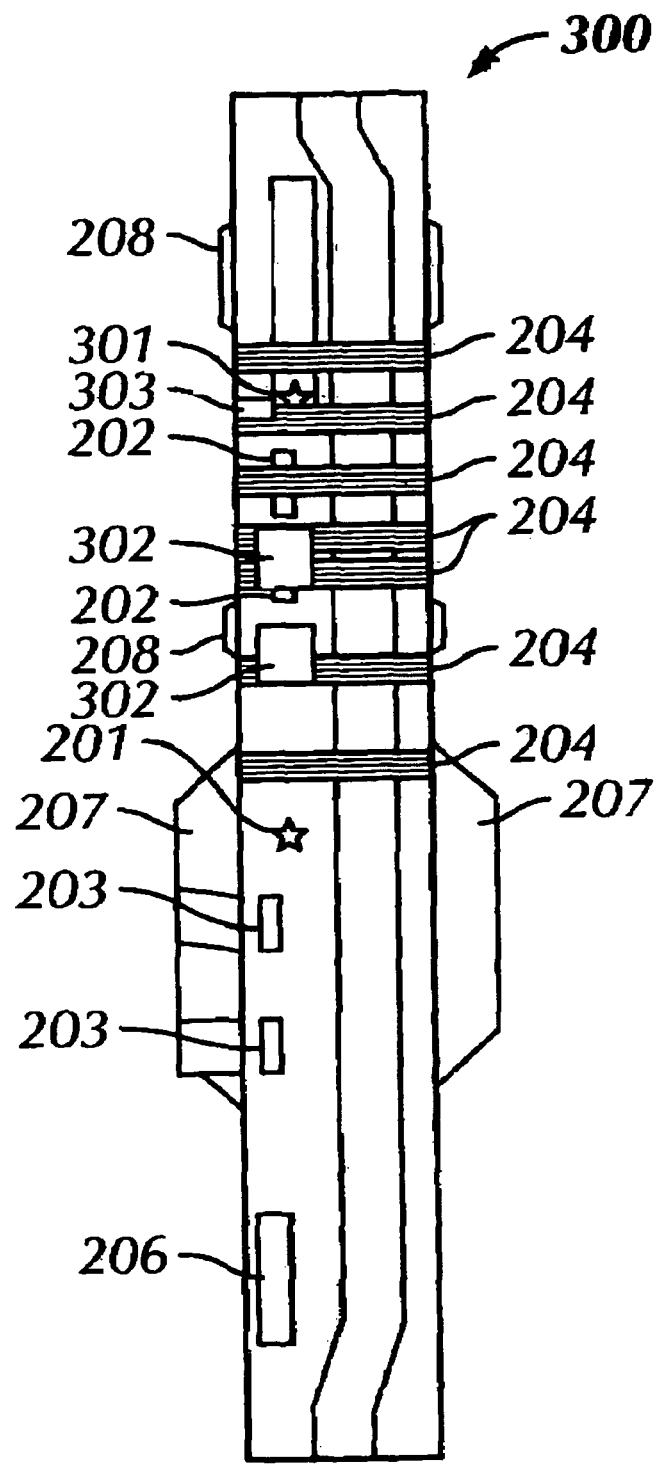
FIG. 2 shows a tool in which an embodiment of the invention can be employed.

FIG. 2 shows an example of a tool 300 according to an embodiment of the present invention. To perform a sigma measurement for example, a pulsed neutron source 301 is used. Such a source is typically based on the d-T reaction

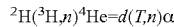

However, other neutron producing reactions such as the d-D reaction can also be employed. The tool shown in FIG. 2 also includes gamma-ray detectors 302. In addition to the gamma-ray detectors 302, neutron detectors 202 are also capable of being located in the tool.

To perform a resistivity measurement for example, resistivity antennae 204 are positioned on the tool 300 to at least partly overlap with the neutron detectors 202 and the gamma ray detectors 302. The resistivity antennae are used to perform propagation resistivity measurements. Typical measurement frequencies are 400 kHz and 2 MHz, but other, higher and/or lower, frequencies may be used to achieve different measurement characteristics.

The overlay of the neutron detectors 202 and the gamma ray detectors 302 with the resistivity antennae 204 allows a tool 300 that is substantially shorter than other tools.

The neutron detectors 202 are located at 2 different distances from the pulsed neutron source 301. The neutron detectors 202 are thermal and/or epithermal neutron detectors, e.g., $^3$He proportional detectors. The tool 300 further comprises two gamma ray detectors 302 interleaved with the neutron detectors 202. Various shielding devices may be used to minimize a direct passage of neutrons from the source 301 to the detectors 202, and to enhance azimuthal response. The shielding devices further allow to reduce the detection by the gamma ray detectors 302 of gamma rays generated by gamma ray source 201 of the tool 300. The shielding material may typically be tungsten (not shown) when used close to the neutron generator 301, or close to the gamma ray detectors 302, and $^{10}$B (Boron 10) (not shown) when used close to the neutron detectors 202. The tool 300 may also include stabilizers 207 and/or wearbands 208 adjacent to the antennae 204 and/or neutron detectors 202 to reduce contact or friction between the antennae 2044 and neutron detectors 202 and the formation.

A neutron monitor 303 is mounted in proximity of the neutron source 301 to determine or monitor the output of the neutron source. The measurement of the output of the neutron source may be used to normalize count rates measured at the neutron detectors 202 or the gamma-ray detectors 302. It may also be used to regulate the neutron source output. The neutron monitor 303 may typically be realized with a plastic scintillator that detects recoil protons.

The gamma ray detectors 302 are preferably realized using scintillation detectors, e.g., NaI(Tl), BGO, CsI, GSO etc. Each gamma ray detector 302 is located at a different distance from the neutron source 301. A detector 302 located at the smallest distance from the source 301 may be used for a determination of an elemental composition of the formation by measurement and analysis of capture gamma ray spectra. The latter detector 302 may furthermore be used to measure a decay of thermal gamma rays in order to deduce a neutron capture cross section (sigma) of the formation and of the borehole. In addition the latter detector 302 may be used to measure gamma ray spectra from inelastic reactions of high energy neutrons. These gamma ray spectra can be analyzed in order to add to the measurement of an elemental composition of the formation and/or for compensation of the density measurement.

While FIG. 2 shows the neutron detectors 202 and the gamma ray detectors 302 in alternating positions, it is understood that this is an example only and that other positions may be envisaged. For example, neutron detectors 202 and gamma ray detectors 302 may be located at a same distance from the source 301, next to each other or integrated in order to produce simultaneous neutron and gamma ray measurements. It can also be envisaged that the gamma-ray detectors are located above the neutron source and the neutron detectors below the neutron source.

In an embodiment, the sigma measurement can be performed using a pulsed neutron generator using a multi-burst approach.

For the measurement the neutron production is pulsed on and off in a predetermined sequence. The bursts of neutrons are followed by time intervals during which the neutrons get thermalized and then slowly decay (die away). A typical time interval for observing the time decay of the formation neutron population ranges from several hundred microseconds to about 2 ms. The measurement determines the rate at which the gamma-ray signal decays after the irradiation of the formation with neutron stops. The decay represents the drop in the neutron population near the tool as more and more neutrons get absorbed by nuclei in the formation and the borehole. The decay time constant can be translated into a measure of the thermal neutron capture cross section of the formation.

In another embodiment, the neutron decay can be measured directly by measuring the number of neutrons returning to the tool with a neutron detector. This measurement is typically less deep than the gamma-ray decay measurement thus affording a sigma measurement with a shallower depth of investigation.

In FIG. 2 the resistivity antennae and the neutron and gamma-ray detectors are collocated or partly overlap. The two measurements are therefore taken simultaneously at the same depth and respond to the same invasion profile. In one embodiment, processing of the resistivity and the nuclear data to obtain invasion-corrected formation properties or an estimated invasion profile will preferably be done at the surface using the sigma and resistivity data sent uphole. However, in another embodiment the processing is performed by the embedded software in the tool positioned downhole.

It should be noted that there are other ways of determining sigma, which are also applicable. For example, by measuring the relative neutron count rates in a pair of neutron detectors, one of which is epithermal and the other one thermal. Preferably, in such an embodiment the two detectors are collocated to obtain a measurement with minimal systematic errors. This measurement does not require the use of a pulsed neutron source, as it relies on a ratio of two count rates.

This configuration allows each detector to offer a different depth of investigation into the formation. One advantage of this configuration is that multiple measurements can be taken simultaneously to establish an invasion profile of borehole fluid invading into the formation. More specifically, the downhole tool in the embodiment of FIG. 2 shows a detector configuration that is able to perform a resistivity and a sigma measurement for different depths of investigation simultaneously. That is, the detector configuration of the tool of FIG. 2 is able to perform a plurality of resistivity and sigma measurements simultaneously and also to do so at a plurality of different depths of investigation into the formation simultaneously. Generally speaking those detectors spaced furthest away from the source on the tool have a deeper depth of investigation into the former than those detectors located closer to the source on the tool.

It be also appreciated that the detector configuration of FIG. 2 additionally allows for other measurements. For example in another embodiment a neutron porosity measurement can be made using the neutron detectors 202 and a neutron chemical source (not shown). In yet another embodiment a gamma density measurement can be performed using a chemical gamma ray source 201 scattered back to gamma ray detectors 203. In yet a further embodiment a natural gamma ray measurement can be performed using a natural gamma ray detector 206.

Figure 3:
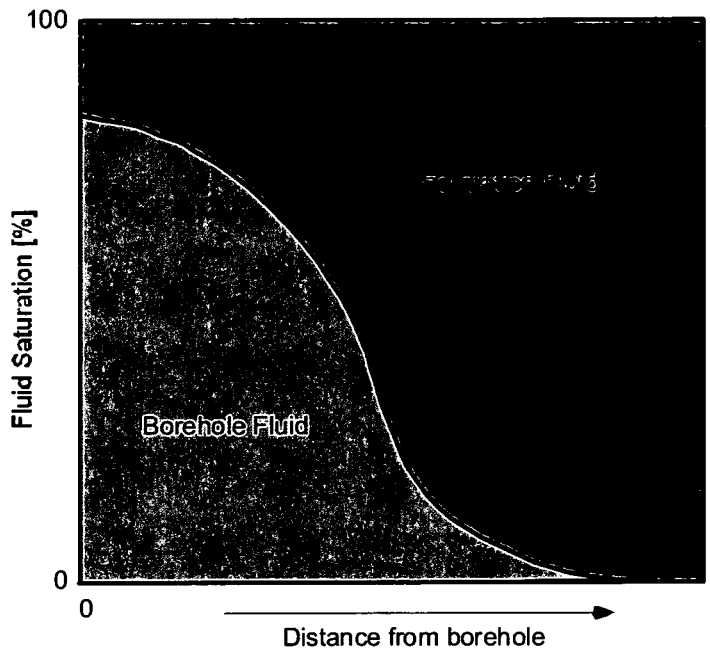
FIG. 3 shows an invasion profile for borehole fluid invading a formation.

FIG. 3 shows an example of invasion of the formation by borehole fluids, for example as a result of drilling a borehole. The specific example of FIG. 3 shows that at the interface between the formation and the borehole, the borehole fluid has displaced 80% of the formation fluid. The composition and properties of the invading fluid are determined by the type of fluid used to drill the borehole, which is usually, but not exclusively, some form of drilling mud. The distance that this fluid invades into the formation and the profile of the invasion front are determined by many factors including the porosity and permeability of the formation.

An embodiment of the invention uses at least some of the detectors on the tool of FIG. 2 to measure a resistivity and a sigma property at multiple depths of investigation into the formation.

The sigma (thermal neutron capture cross section) of the formation can be expressed as:

$$\Sigma = (1-\Phi)\Sigma_m + \Phi S_w \Sigma_w + \Phi(1-S_w)\Sigma_h \tag{Eqt.1}$$

Where
$\phi$=porosity
$\Sigma_m$=sigma of the rock matrix
$\Sigma_h$=sigma of the hydrocarbon
$\Sigma_w$=sigma of the pore water
$S_w$=formation water saturation The resistivity ($R_t$) of the formation may be written as:

$$R_t = \frac{1}{\Phi^m} \cdot \frac{R_w}{S_w^n} \tag{Eqt. 2}$$

Where
$\phi$=porosity
$R_w$=pore water resistivity
$S_w$=formation water saturation
m=Archie cementation factor
n=Archie saturation exponent The properties of the formation water, $\Sigma_w$ and $R_w$, are a function of the temperature and the salinity of the water.

Figure 4A:
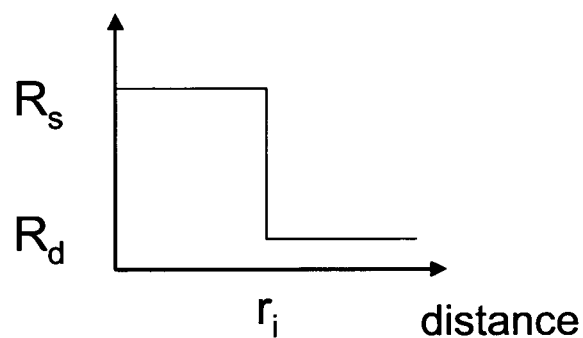
FIG. 4a shows a resistivity response for a simple step-invasion profile according to an embodiment.
Figure 4B:
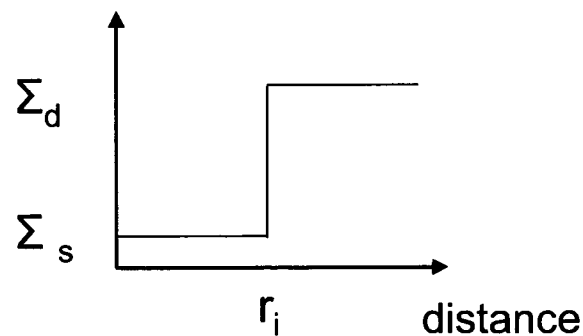
FIG. 4b shows a sigma response for a simple step-invasion profile according to an embodiment.

FIGS. 4a and 4b are resistivity and sigma plots respectively, in which the invasion profile of FIG. 3 has been simplified as a step function where $r_i$ indicates the radius of invasion. That is, for each plot there are two distinct zones: the invaded zone (zone 1) and the uninvaded zone (zone 2) in which the radial distance from the borehole to the boundary between the two zones is the $r_i$.

By taking resistivity and sigma measurements in each of the zones FIG. 4a shows that the invaded zone has a higher resistivity (lower salinity) than the uninvaded zone of the formation, whereas FIG. 4b shows that invaded formation has a lower sigma (lower salinity) than the uninvaded formation. Thus, an embodiment of the present invention is arranged to perform resistivity and sigma measurements at different depths of investigation or zones in the formation.

In each of the two zones, it is noted that each of the resistivity and sigma response is a function of the water salinity and water saturation:

$$\Sigma_1 = f(\text{sal}_{w1}, S_{w1}) \tag{Eqt.3}$$

$$\Sigma_2 = f(\text{sal}_{w2}, S_{w2}) \tag{Eqt.4}$$

$$R_1 = f(\text{sal}_{w1}, S_{w1}) \tag{Eqt.5}$$

$$R_2 = f(\text{sal}_{w2}, S_{w2}) \tag{Eqt.6}$$

Taking equations (1) and (2) into account the response equations (3) to (6) for each of the two zones are expressed in the as follows:

$$\Sigma_1 = (1-\Phi)\Sigma_m + \Phi S_{w1}\Sigma_{w1} + \Phi(1-S_{w1})\Sigma_h \tag{Eqt. 7}$$

$$\Sigma_2 = (1-\Phi)\Sigma_m + \Phi S_{w2}\Sigma_{w2} + \Phi(1-S_{w2})\Sigma_h \tag{Eqt. 8}$$

-continued $$R_1 = \frac{1}{\Phi^m} \cdot \frac{R_{w1}}{S_{w1}^n} \quad \text{(Eqt. 9)}$$

$$R_2 = \frac{1}{\Phi^m} \cdot \frac{R_{w2}}{S_{w2}^n} \quad \text{(Eqt. 10)}$$

Some of the properties in the equations above can be obtained independently or with a priori knowledge. For example, knowledge of the porosity can be assumed or can be obtained from other measurements. Alternatively, the porosity can be measured with the same downhole tool for example using well-established methods such as radiating the formation with gamma-rays and measuring the number of gamma rays returning to detectors. The gamma-ray count is indicative of the bulk density of the formation. If the matrix density is known the porosity can be determined.

The matrix capture cross section can be assumed or obtained from other measurements. In one embodiment if the type of rock matrix is assumed, then properties such as the capture cross section are obtainable from known records. In another embodiment it is also possible to measure the type of rock using capture gamma-ray spectroscopy methods and to determine the matrix capture cross section from established relationships.

The properties m and n of the resistivity equations are the so-called "Archie coefficients" which are well-known and are normally determined empirically for a particular field or location.

The sigma of the hydrocarbon can be established from known data (the range is relatively small) or in the case of a gas, from known data and measurements of downhole pressure.

Thus, there remain four unknown formation properties to be solved for, i.e. the water saturation and the water salinity in each of the two zones. Since the tool of the embodiment of FIG. 2 is able to perform four independent measurements simultaneously, it is possible to solve for the four unknown formation properties. It should be appreciated that the tool is capable of generally solving for multiple unknowns, but for purposes of the explanatory embodiment four unknowns are described.

Figure 5:
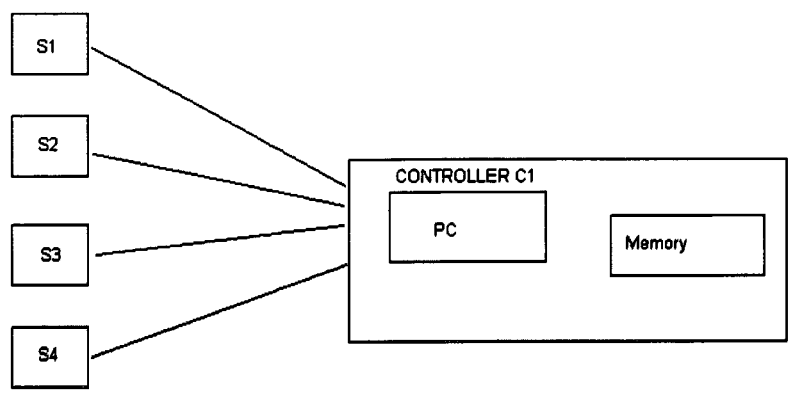
FIG. 5 shows an exemplary embodiment of functionality for processing the plurality of measurements to obtain the formation properties.

FIG. 5 shows an example of apparatus for processing the plurality of measurements to obtain the formation properties. Specifically, a plurality of detectors S1 to S4 are shown that are controlled by a controller C1. The controller is able to communicate with each of the detectors either wirelessly or by way of fixed connection. Processor circuitry PC is shown located within the controller C1 as well as a memory unit M1. The processor circuitry could for example be implemented in hardware or software and would include circuitry or a programmed algorithm representing equations 7 to 10 above. Specifically equations 7 to 10 are a predetermined model, which relate the sigma and resistivity measurements as a function of the formation properties to be solved; i.e. water salinity and saturation, and a plurality of other properties that can be determined a-priori.

It should be appreciated that while this processing can be implemented within the downhole tool, in another embodiment is possible that this is done on the surface using data transmitted from the tool to the surface. Moreover, it is possible that a user on the surface can tweak the detector configuration, or unknowns to be measured for or change the predetermined model as desired.

Thus, in one embodiment the sigma and resistivity measurements from the detectors S1 to S4 would be selectively requested and simultaneously performed by the controller C1. These measurements would then be input into the processing circuitry programmed with the predetermined model. The predetermined model would also be able to take as input the a-priori properties of the model which could be stored in memory M1. The processing circuitry then applies the detector measurement and the a-priori properties to the predetermined model and is able to simultaneously solve for the unknown formation properties, i.e. the water salinity and saturate at different depths into the formation.

It should be appreciated that the present invention is able to solve for multiple unknown properties simultaneously. Also, different embodiments might solve for different depths of investigation which are present in either of the invaded and uninvaded zones. However, the properties in the uninvaded zone are normally more interesting to a user of the tool interpreting the geological results obtained therefrom. However by taking measurements within the invaded zone as well it is possible to automatically account for the invasion profile amongst the set of unknowns which is solved.

It should also be appreciated that the sigma and resistivity measurements can be made in real-time while drilling and that this information can be provided to users at the surface (via telemetry). This advantageously allows a user on the surface to view the data in a substantially real-time manner and to make real-time decisions based thereon.

The invention claimed is:

1. A downhole tool in a borehole for determining properties of a formation, the tool comprising:
    a nuclear source for irradiating the formation;
    a plurality of detectors capable of measuring at a plurality of radial depths into the formation;
    a plurality of antennas capable of measuring at a plurality of radial depths into the formation, wherein the detectors and the antennas are collocated or at least partly overlap;
    a controller for enabling the antennas and the detectors to perform a resistivity and a sigma measurement for the plurality of radial depths; and
    a processing apparatus arranged to combine the detector and antenna measurements to determine an invasion profile of the borehole fluid into the formation, based on the resistivity measurements for the plurality of radial depths and on the sigma measurements for the plurality of radial depths and to determine the properties of the formation based on the resistivity measurements for the plurality of radial depths and on the sigma measurements for the plurality of radial depths, wherein the properties comprise water saturation in an invaded zone and in an uninvaded zone of the formation and water salinity in an invaded zone and in an uninvaded zone of the formation.

2. The downhole tool of claim 1, wherein the controller is capable of controlling the detectors and antennas to perform the resistivity and sigma measurements simultaneously.

3. The downhole tool of claim 1, wherein the processing apparatus inputs the measurements with a predetermined model so as to simultaneously determine the properties of the formation.

4. The downhole tool of claim 1, wherein a fluid from the borehole has invaded a portion of the formation such that the measurements are performed at a first radial depth within an invaded portion of the formation and measurements are performed at a second radial depth within an uninvaded portion of the formation.

5. The downhole tool of claim 4, wherein the properties to be determined are the saturation and salinity of the formation at each of the first and second radial depths.

6. The downhole tool of claim 1, wherein the predetermined model defines resistivity and sigma each as a function of salinity and saturation of water in the formation.

7. The downhole tool of claim 1, wherein the processing apparatus is configured to apply the following equations simultaneously to determine the properties of the formation:

$$\Sigma_1 = (1-\Phi)\Sigma_m + \Phi S_{w1}\Sigma_{w1} + \Phi(1-S_{w1})\Sigma_h$$

$$\Sigma_2 = (1-\Phi)\Sigma_m + \Phi S_{w2}\Sigma_{w2} + \Phi(1-S_{w2})\Sigma_h$$

$$R_1 = \frac{1}{\Phi^m} \cdot \frac{R_{w1}}{S_1^n}$$

$$R_2 = \frac{1}{\Phi^m} \cdot \frac{R_{w2}}{S_{w2}^n}$$

wherein $\Sigma_1$ is a sigma measurement at a first zone, $\Sigma_2$ is a sigma measurement at a second zone, $S_{w1}$ is a formation water saturation at the first zone, $S_{w2}$ is a formation water saturation at the second zone, $\Sigma_{w1}$ is a sigma measurement of pore water at the first zone, $\Sigma_{w2}$ is a sigma measurement of pore water at the second zone, $\Phi$ is the porosity, $\Sigma_h$ is a sigma measurement of hydrocarbon, $\Sigma_m$ is a matrix capture cross section, $R_{w1}$ is pore water resistivity at the first zone, $R_{w2}$ is pore water resistivity at the second zone, m is an Archie cementation factor, and n is an Archie saturation exponent.

8. The downhole tool of claim 1, wherein each of the detectors are spaced at different longitudinal distances on the tool away from the nuclear source.

9. A method for determining properties of a formation, the method comprising:
    irradiating the formation with at least one nuclear source;
    performing both a resistivity and a sigma measurement at each of different radial depths into the formation with sensors and antennas that are collocated or at least partly overlap; and
    using a processor to combine the resistivity measurements for the plurality of radial depths and the sigma measurements for the plurality of radial depths to determine an invasion profile of the borehole fluid into the formation and properties of the formation based on the resistivity measurements for the plurality of radial depths and on the sigma measurements for the plurality of radial depths, wherein the properties comprise water saturation in an invaded zone and in an uninvaded zone of the formation and water salinity in an invaded zone and in an uninvaded zone of the formation.

10. The method of claim 9, wherein the combining step further comprises:
    inputting the measurements into a model for determining the properties of the formation simultaneously.

11. The method of claim 10, wherein the step of performing measurements is done simultaneously for both the sigma and resistivity measurements at different radial depths.

* * * * *